(12) United States Patent
Franco et al.

(10) Patent No.: US 6,213,057 B1
(45) Date of Patent: Apr. 10, 2001

(54) HARNESS FOR DOMESTIC ANIMALS

(75) Inventors: Andreino Franco, Roletto; Livio Bocchiardo, Pinerolo, both of (IT)

(73) Assignee: L.A.C. Di Albertengo & C.S.N.C., S. Secondo Di Pinerolo (IT)

( * ) Notice: Subject to any disclaimer, the term of this patent is extended or adjusted under 35 U.S.C. 154(b) by 0 days.

(21) Appl. No.: 09/333,395

(22) Filed: Jun. 15, 1999

(30) Foreign Application Priority Data

Mar. 2, 1999 (EP) .................................................. 99830110

(51) Int. Cl.⁷ .................................................. A01K 27/00
(52) U.S. Cl. .......................... 119/793; 119/863; 119/907
(58) Field of Search .................... 119/792, 863, 119/793, 907

(56) References Cited

U.S. PATENT DOCUMENTS

| | | | |
|---|---|---|---|
| 2,464,867 | * | 3/1949 | Johnson . |
| 2,555,027 | * | 5/1951 | Clayton . |
| 2,605,744 | * | 8/1952 | Urbanski . |
| 3,768,445 | * | 10/1973 | Sorrels ................................. 119/856 |
| 5,247,905 | * | 9/1993 | Arakawa .............................. 119/863 |
| 5,427,061 | * | 6/1995 | McCullough ........................ 119/771 |
| 5,443,037 | * | 8/1995 | Saleme ................................. 119/771 |
| 5,503,113 | * | 4/1996 | Knight ................................. 119/856 |
| 5,676,093 | * | 10/1997 | Sporn ................................... 119/792 |
| 5,893,339 | * | 4/1999 | Liu ....................................... 119/792 |
| 5,915,335 | * | 6/1999 | Holt, Jr. ............................... 119/771 |

* cited by examiner

*Primary Examiner*—Charles T. Jordan
*Assistant Examiner*—Yvonne R. Abbott
(74) *Attorney, Agent, or Firm*—Helfgott & Karas, P.C.

(57) ABSTRACT

The invention relates to a harness comprising a belly strap for surrounding the animal belly and a front strap for surrounding the front area of the neck, joined to one another by side connecting members, a lower connecting strap joining the belly strap with the front strap, and a symmetrical length-adjustment device comprising two upper straps connecting the side connecting members respectively to a first and a second portion of a releasable clip that can be located as desired along said upper straps.

10 Claims, 5 Drawing Sheets

HARNESS FOR DOMESTIC ANIMALS

BACKGROUND OF THE INVENTION

Field of the Invention

The present invention relates to a harness or breast collar for attaching a leash to a domestic animal or pet such as a dog.

More particularly, the invention concerns a harness of the type comprising a first strap portion extending under the animal belly, a second strap portion extending under the animal neck, and an upper strap portion joining together the ends of such straps, generally in a releasable manner, thus providing an anchoring point for attaching the leash.

As it is known harnesses or breast collars are generally assembled by joining together portions of leather or nylon straps by means of fasteners such as for example rings, plates or clips made of metal or plastic.

These harnesses are built with different dimensions to fit dogs of different size, and generally comprise systems for adjusting the length of the straps for properly fitting the harness to a given animal for preventing the animal from accidentally getting free without unduly limiting the animal movements with a too tight harness.

A known adjustable animal harness is disclosed in U.S. Pat. No. 5,247,905. The disclosed harness comprises a belly or body strap and a front strap the ends of which are joined together by metal plates provided with slits, a lower strap to be located between the animal legs and connecting the belly strap with the front strap, and an upper connecting member joining said two connecting plates and provided with a ring for the attachment of a leash.

Both the lengths of the belly and the front straps can be adjusted. To this aim each strap is provided at one end with a strap adjustment system having a slidably movable buckle for folding back a portion of the strap in order to shorten its length.

Such adjustment system is asymmetric since the length of a strap can be adjusted only at one of its ends and as a consequence of either a shortening or a lengthening operation, the lower connecting strap moves out from the optimum position that is centred between the animal legs.

On this account in the known harnesses of this type the lower connecting strap that joins the belly strap with the front strap is not fixed, but rather is free to slide along the straps to which it is connected.

Apparently this trick solves the above mentioned problem, but nevertheless it brings about other inconveniences. Namely when the harness is fitted to a dog, the connecting strap can be wrongly positioned, for example laterally displaced, thus either slowing down the harness application, or negatively affecting a proper fitting, and therefore the harness safety, if the user does not realise the wrong position of the strap.

SUMMARY OF THE INVENTION

A first object of the present invention is therefore to realise a harness provided with a symmetric and particularly safe adjustment device.

Another object of the present invention is to provide a harness that can be manufactured easily and at low cost.

The above objects of the present invention are accomplished through a harness as claimed in the attached claims. According to the invention the harness is equipped with a symmetric adjustment device provided on both sides thereof for reliably accommodating dogs of different size.

Thanks to such double adjustment device, the harness of the invention has improved safety characteristics when compared with the prior art articles. Moreover thanks to the fixed lower connecting strap, all the straps that are in contact with the dog body can be covered with a soft or padded material for an improved comfort of use.

The above objects will become evident from the following detailed description of preferred embodiments of the harness according to the invention, with particular reference to the attached drawings.

DETAILED DESCRIPTION OF PREFERRED EMBODIMENTS

Figure 1:
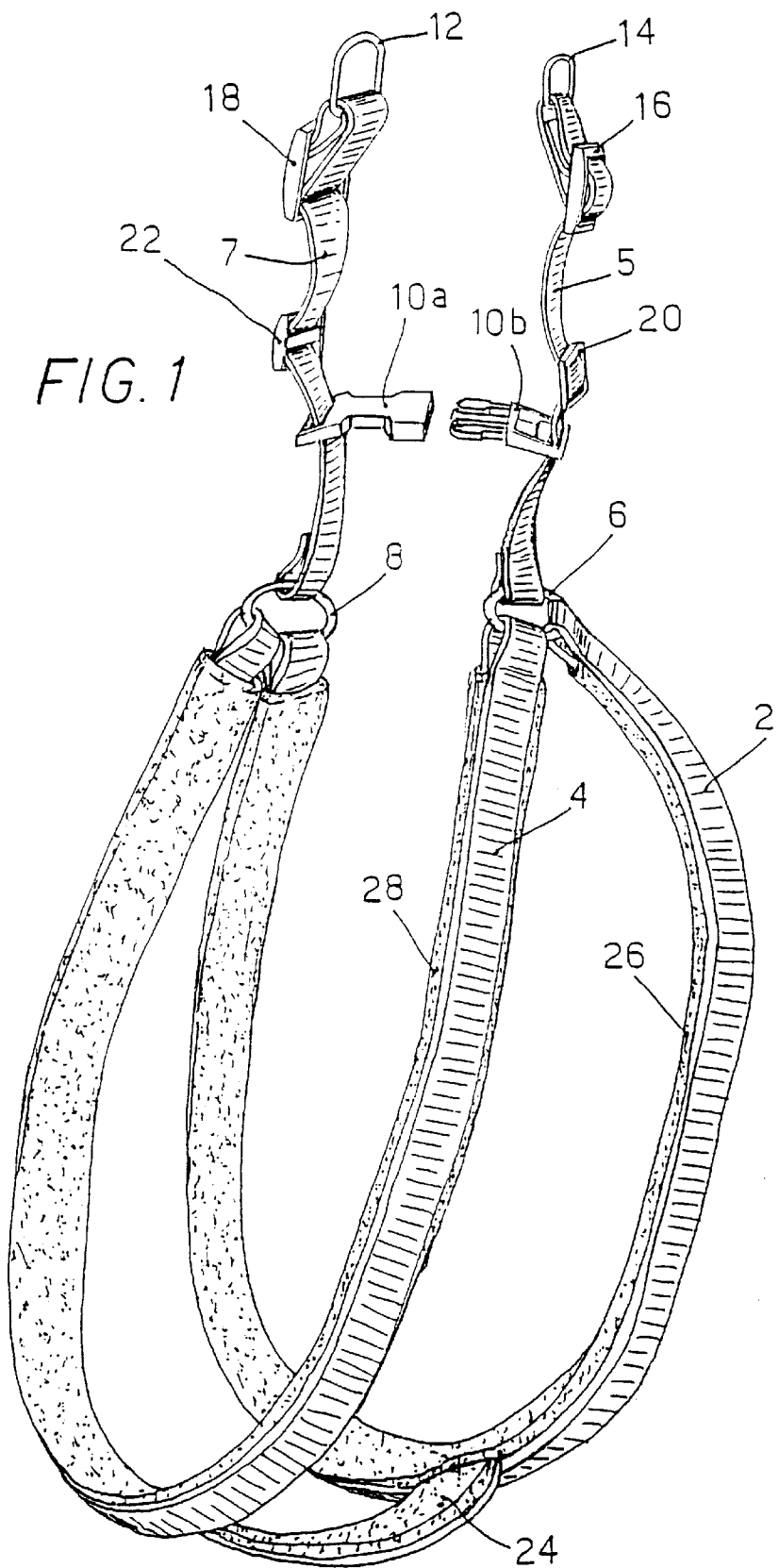
FIG. 1 is an overall view of a harness according to the invention.

With reference to FIG. 1 a harness according to the invention comprises a belly or body strap (portion) 2 to be positioned under the animal belly and a front strap (portion) 4 extending along the front area of the neck, such straps being joined to each other at their ends by side connecting means or members 6, 8, a lower connecting strap (portion) 24 for joining the belly strap 2 to the front strap 4, and two upper straps 5, 7. One end of each of straps 5, 7 is connected to one of the side connecting means 6, 8, whereas a first portion 10a and a second portion 10b of a releasable clip 10 that closes the harness over the animal back are slidably engaged in a respective one of straps 5, 7. The other ends of straps 5, 7 are respectively connected with two rings 12, 14 to which a leash can be attached.

The straps forming the harness can be made of leather, braided nylon or other similar materials.

The length of the belly strap 2 and the length of the front strap 4 are fixed, preferably with the front strap 4 being slightly shorter than the belly strap 2, and their ends are secured by means of sewing or heat-bonding to the side connecting members 6, 8, each of said connecting members being formed by a metal ring.

A first end of each upper strap 5, 7 is sewn or heat bonded to a respective side connecting ring 6, 8 while the other end enters a ring 12, 14, used for attaching a leash, and is then secured to a slidably movable buckle that can be moved along the strap 5, 7 for adjusting the length thereof.

The two portions 10a and 10b of the releasable clip 10 slidably engage the two upper straps 5, 7 and their displacement along the straps is restrained at the bottom by the metal rings 6, 8 and at the top by stop members 20, 22 that can be secured at any desired position along the straps.

By suitably adjusting the position of the two stop members 20, 22 the user can adjust the inner dimension of the harness, on both side, in a simple, quick and symmetric manner. Namely when the clip 10 is secured near the two rings 6 and 8, the harness can fit small size animals, whereas larger animals can be accommodated by positioning the clip 10 in the high portion of the two upper straps 5, 7.

Figure 2:
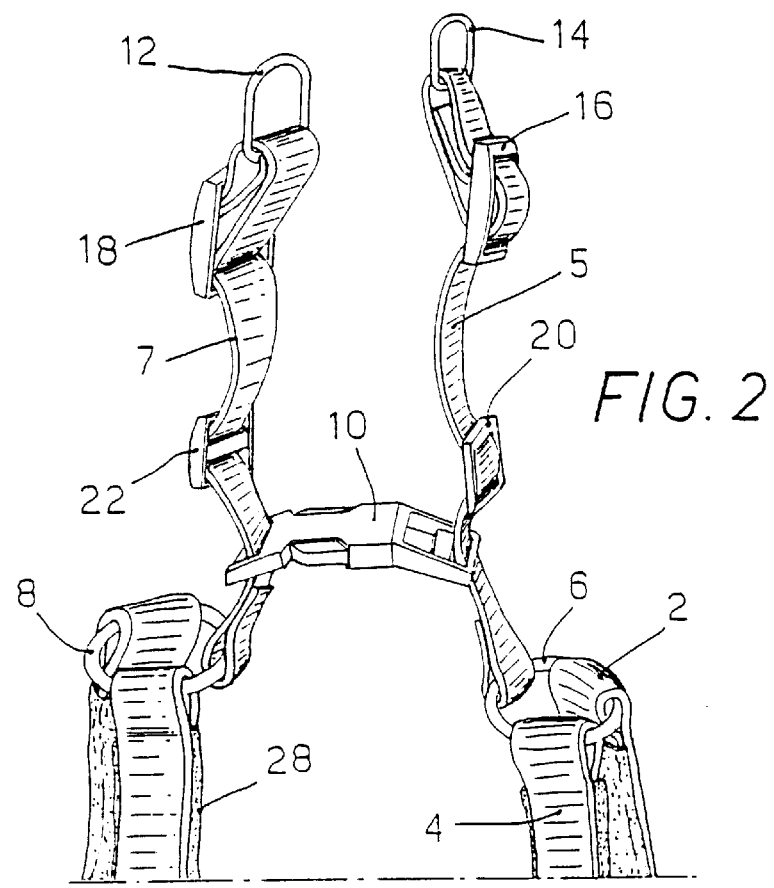
FIG. 2 is a view showing a detail of the harness of FIG. 1.

The two stop members can be formed as two simple plastic buckles 20, 22 in which the corresponding straps 5, 7 are inserted. As an alternative, in case the length of the upper straps 5, 7 can be adjusted by means of buckles, as shown in FIGS. 1 and 2, the same buckles 16, 18 used for such adjustment can act as stop members, thus accomplishing also the task of buckles 20 and 22 that are no longer required. In this case the two buckles 20 and 22 should be positioned below the clip 10 for limiting its displacement downwardly.

Advantageously since no length adjustment device is necessary on the belly strap 2 and the front strap 4, their inner sides in contact with the animal can be completely covered with a soft material allowing the perspiration. Such covering renders the harness more comfortable and further imparts a certain degree of rigidity that makes easier both the application and the removal of the harness.

Moreover, since the length adjustment system is completely symmetrical, i.e. a device provided on both sides, the lower connecting strap 24 can be sewn, heatbonded or otherwise secured to the central portions of the belly and front straps. This way the lower connecting strap 24 is always optimally located, i.e. centrally with respect to the animal legs, and its inside surfaces can be covered with the same material used for covering the belly and front straps.

FIG. 2 shows with more details the symmetrical adjustment system of the harness illustrated in FIG. 1. In this Figure the releasable clip 10 is shown as closed and the two buckles 20 and 22 inserted in the straps 5 and 7 act as stop members. The two buckles 20 and 22 limit upwardly the position of clip 10 thereby limiting the inner dimensions of the harness.

Although a length adjustment of the two upper straps 5, 7 accomplished through the buckles 16 and 18 is not mandatory, nevertheless it can be useful in order to shorten such straps when the harness is adjusted to the smallest size.

Figure 3:
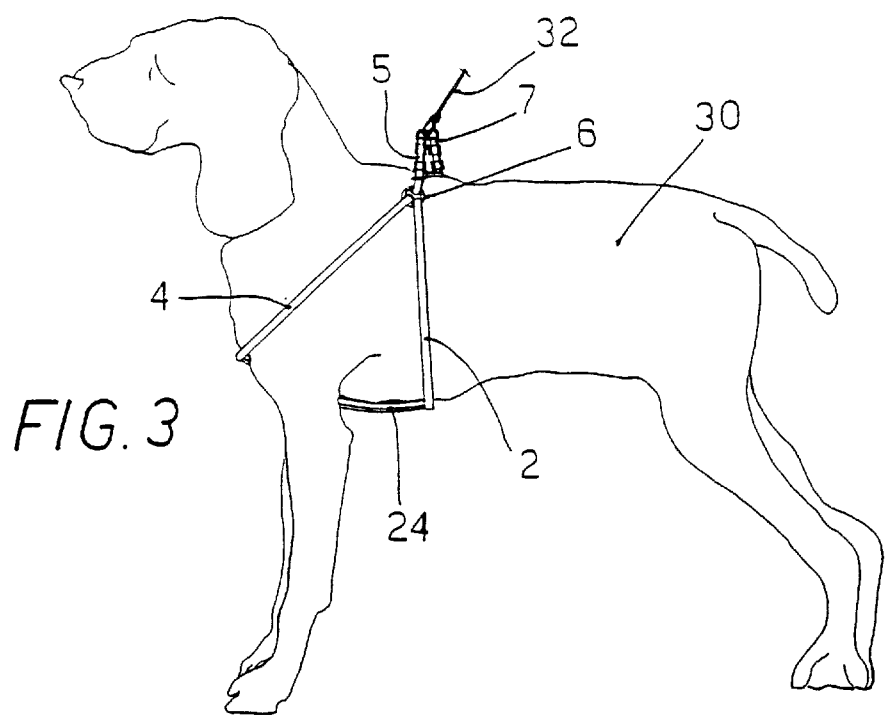
FIG. 3 shows a harness according to the invention when applied to a dog.

FIG. 3 shows a harness according to the invention fitted to a dog 30. More particularly the Figure shows the belly strap 2, the front strap 4, the lower connecting strap 24, a side connection ring 6, the two upper straps 5, 7 provided with the adjustment device and a leash 32 attached to their ends.

Figure 4:
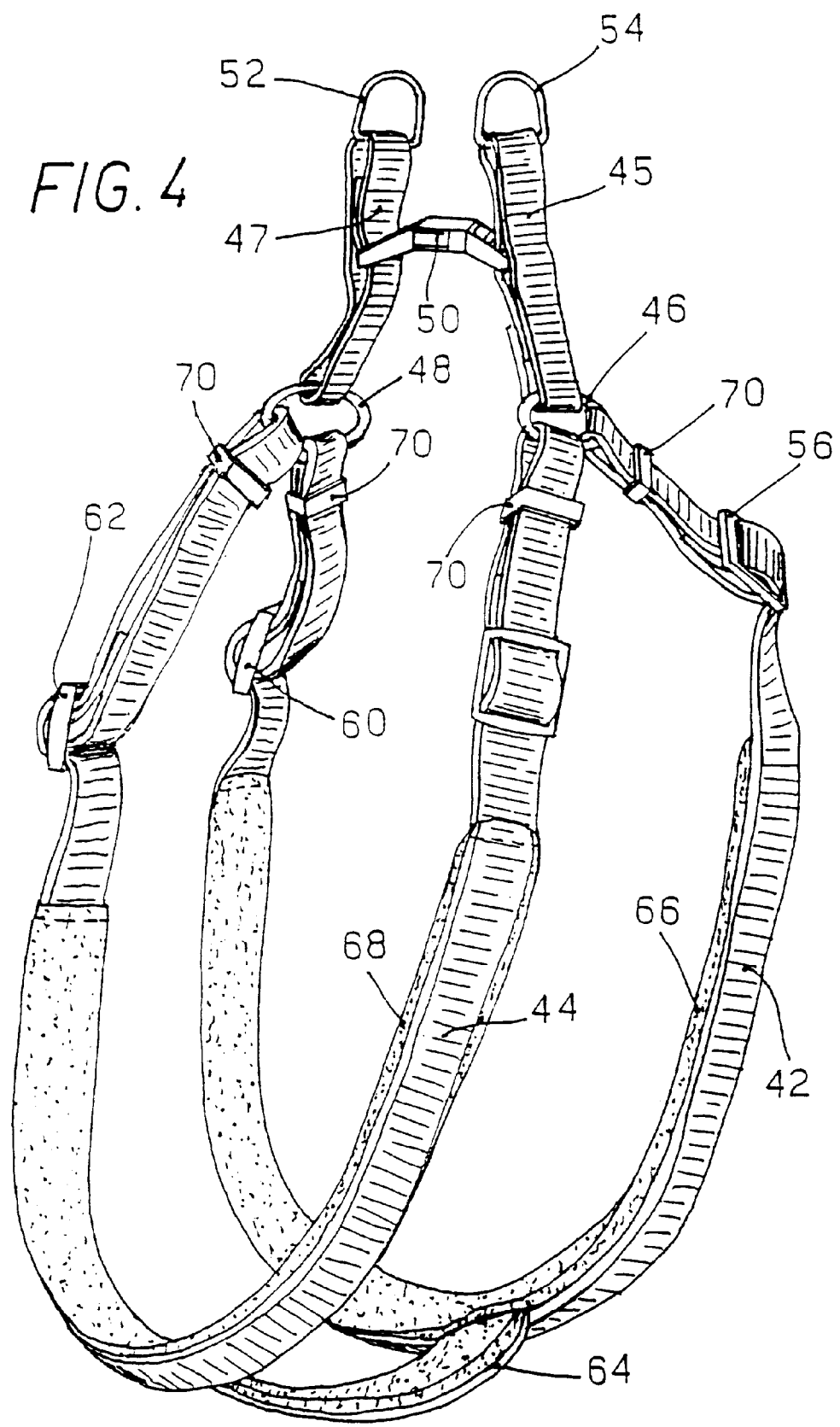
FIG. 4 is an overall view of a second embodiment of a harness according to the invention.
Figure 5:
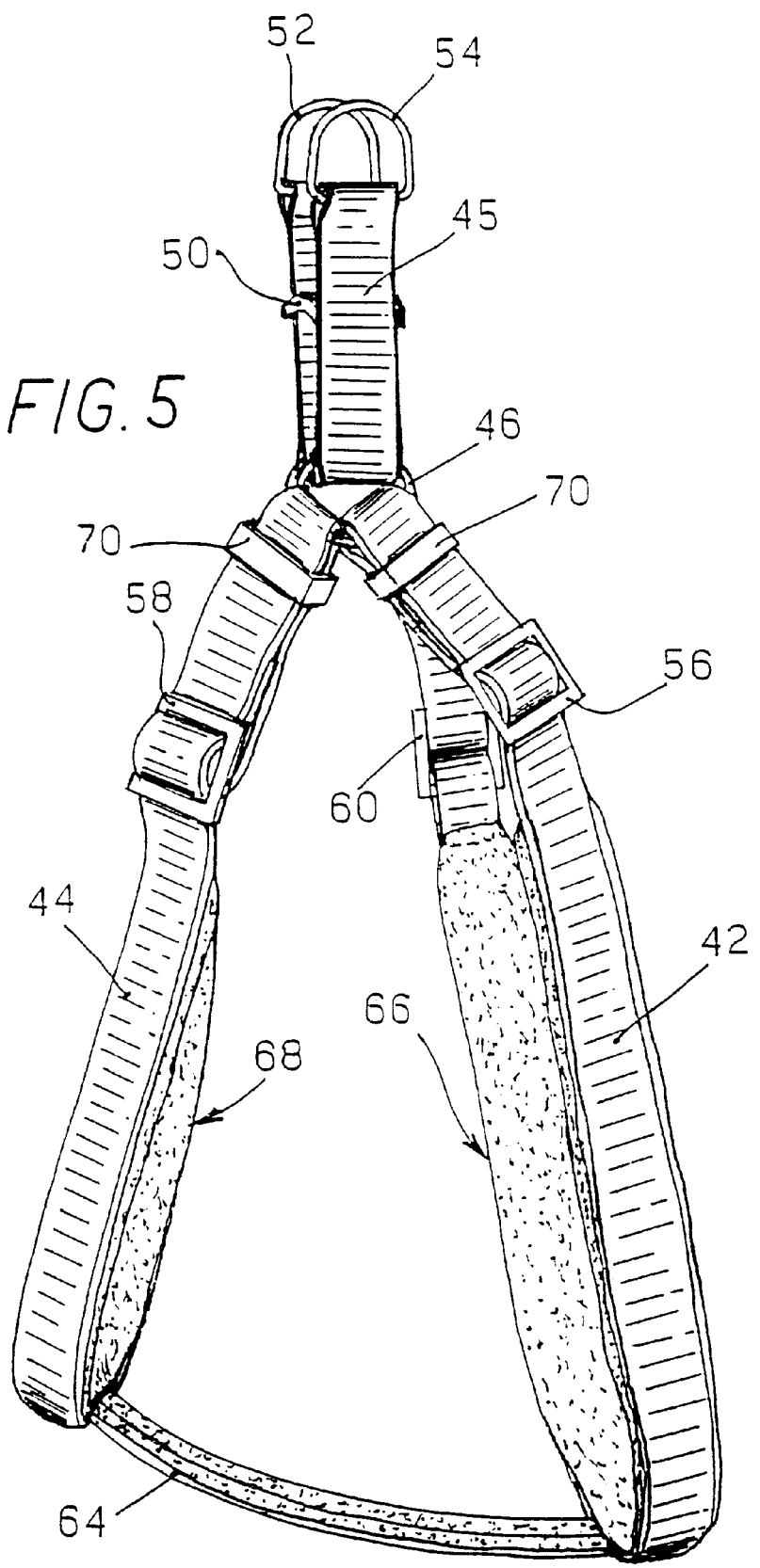
FIG. 5 is a side view of the harness of FIG. 4.

On the other hand, FIGS. 4 and 5 show an overall view and a side view respectively of a second embodiment of a harness according to the invention.

More particularly, in this embodiment the symmetrical adjustment of the harness size is achieved by providing a length-adjustment device on both the belly strap 42 and the front strap 44. At each strap end, the two straps 42 and 44 are provided with a length-adjustment device equipped with a slidably movable buckle.

The ends of each strap portion thread the corresponding connecting side rings 46, 48 and are secured to corresponding slidably movable buckles 56, 58, 60, 62 so that their lengths can be adjusted as desired. Four flat plastic rings 70 of rectangular shape maintain taut the strap portion that has been folded.

Thanks to the double-adjustment feature provided on each strap portion, both strap portions can be lengthened or shortened while always maintaining the padded central portion 66, 68 of each strap centred with respect to the animal belly. This way also the lower connecting strap 64 remains centred.

In this embodiment of the invention no adjustment is required of the two upper straps 45, 47 connecting the side rings 46, 48 to the two rings 52, 54 for attaching the leash. The same applies also to the clip 50 that closes the harness over the animal back. Namely the lengths of the upper straps 45, 47 are fixed and the two portions of clip 50 are secured at an intermediate position between the side rings 46, 48 and the upper rings 52, 54.

Figure 6:
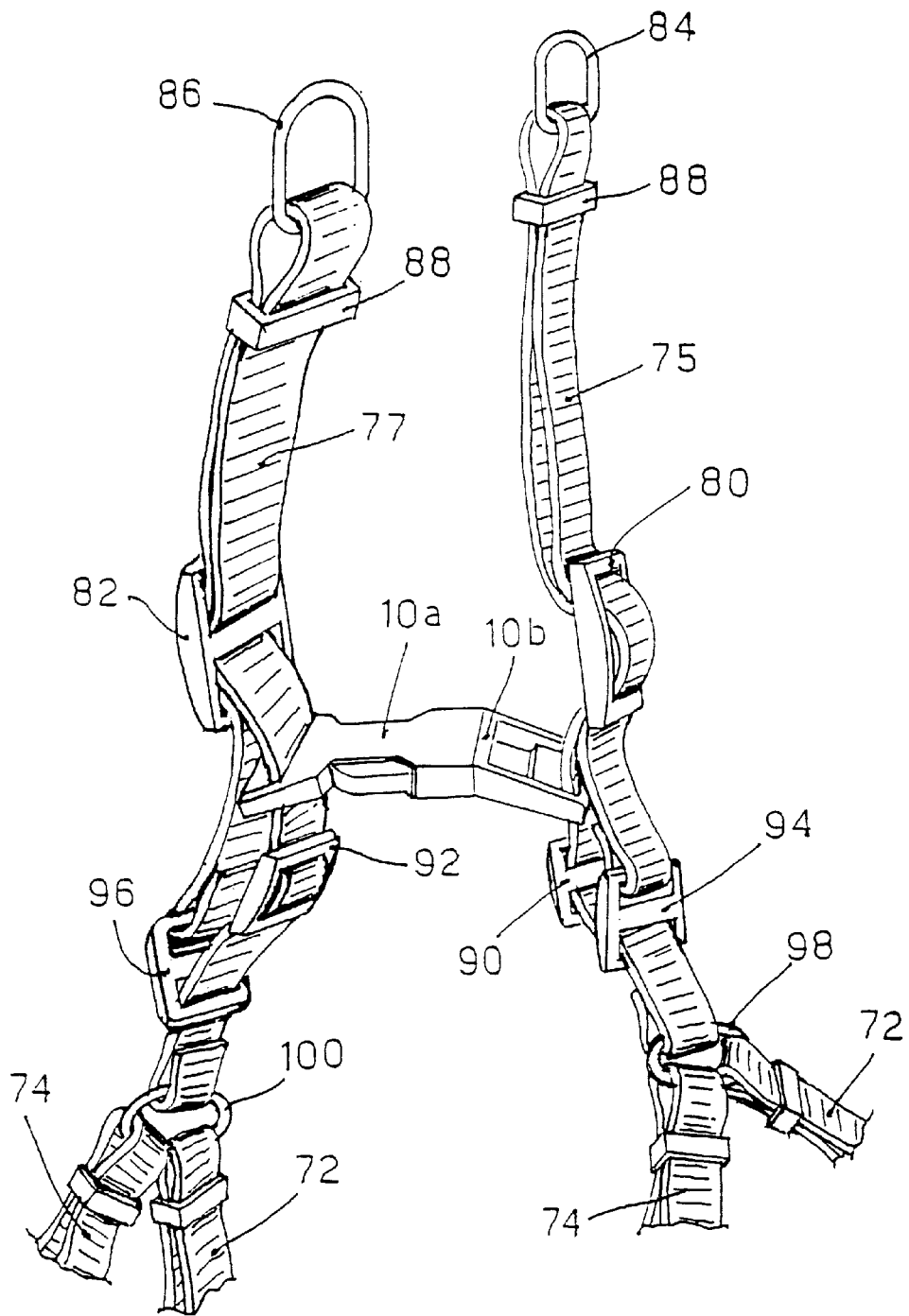
FIG. 6 is a view of a detail of a third embodiment of a harness according to the invention.

FIG. 6 illustrates a third embodiment of a harness incorporating a symmetrical adjustment device in the upper strap portions. In this embodiment the lengths of the belly strap 72 and the front strap 74 are fixed by means of sewing or heat-bonding them to the side connecting rings 98 and 100.

Two upper straps 75 and 77 are coupled to rings 98 and 100, and along these strap portions a first portion 10a and a second portion 10b of a releasable clip 10 for upwardly closing the harness can slide.

Each upper strap 75, 77 enters a ring 84, 86, used for attaching the leash, and is folded back for returning to a length-adjusting buckle 80, 82 into which it is threaded. The free ends of these straps are fastened by two slidably movable small buckles 94 and 96.

Two plastic rings 88 maintain the straps taut near the two rings 84 and 86. The buckles 80 and 82, used for adjusting the length of the upper straps 75, 77 also act as upper limits for the two clip portions 10a and 10b, thus defining the harness size. On the other hand two small buckles 90 and 92 limit their displacements downwardly.

This adjustment device allows therefore for a wider length range of the two upper straps and further allows the adjustment of the clip along their whole length.

What is claimed is:

1. An animal harness comprising:
   a belly strap portion surrounding the animal belly,
   a front strap portion surrounding the neck front area, the ends of said belly and front straps being joined to each other through side connecting means,
   a pair of upper straps adapted to connect said side connecting means with a first portion of a releasable clip disposed on one of said pair of upper straps and a second portion of a releasable clip disposed on the other of said pair of upper straps for closing the harness over the animal back, at least one of said pair of upper straps further comprising a ring for attaching a leash,
   whereby each portion of said releasable clip is slidable along its corresponding upper strap in a range that is limited upwardly by a stop member secured to said corresponding upper strap and positionable at any desired location thereon, in order to change the size of the harness and adapt it to animals of different size.

2. A harness as claimed in claim 1, wherein the length of each upper strap is adjustable, each upper strap is connected at one end to said side connecting means and the ring for attaching the leash is positioned at an opposite end of the upper strap to which said ring is attached.

3. A harness as claimed in claim 1, wherein said stop member is a first buckle used for adjusting the length of the corresponding upper strap.

4. A harness as claimed in claim 3, wherein each of said pair of upper straps is provided with a ring for attaching a leash and further provided with a second buckle, and wherein each upper strap passes through said first buckle, is folded back into said ring, passes again through said first buckle and terminates in said second buckle movable along an initial portion of said upper strap.

5. A harness as claimed in claim 1, wherein said belly strap and said front strap are internally covered with a soft perspiration-absorbent material.

6. A harness as claimed in claim 1, wherein said belly strap and said front strap are joined at their central parts by a fixed spacing strap.

7. A animal harness of the type comprising a belly strap surrounding the animal belly, a front strap surrounding the front area of the neck, the ends of said belly strap and front strap being joined to one another by side connecting means, a pair of upper straps adapted to join said side connecting means to a first and a second portions of a releasable clip that closes the harness above the animal back, and with at least a ring for attaching a leash, wherein each of the belly strap and front strap is provided at both ends with length-adjusting means for changing the harness size and adjust it to animals of different sizes.

8. A harness as claimed in claim 7, wherein in each length adjustment means each of the belly strap and front strap slidably passes through an opening in the corresponding side connecting means and the free end of each of the belly strap and front strap is secured to a buckle movable along each of the belly strap and front strap.

9. A harness as claimed in claim 7, wherein said belly strap and said front strap are internally covered with a soft perspiration-absorbent material.

10. A harness as claimed in claim 7, wherein said belly strap and said front strap are joined at their central parts by a fixed spacing strap.

* * * * *